May 26, 1942.  G. R. METZDORF  2,284,007
AIR VALVE
Filed Aug. 2, 1940
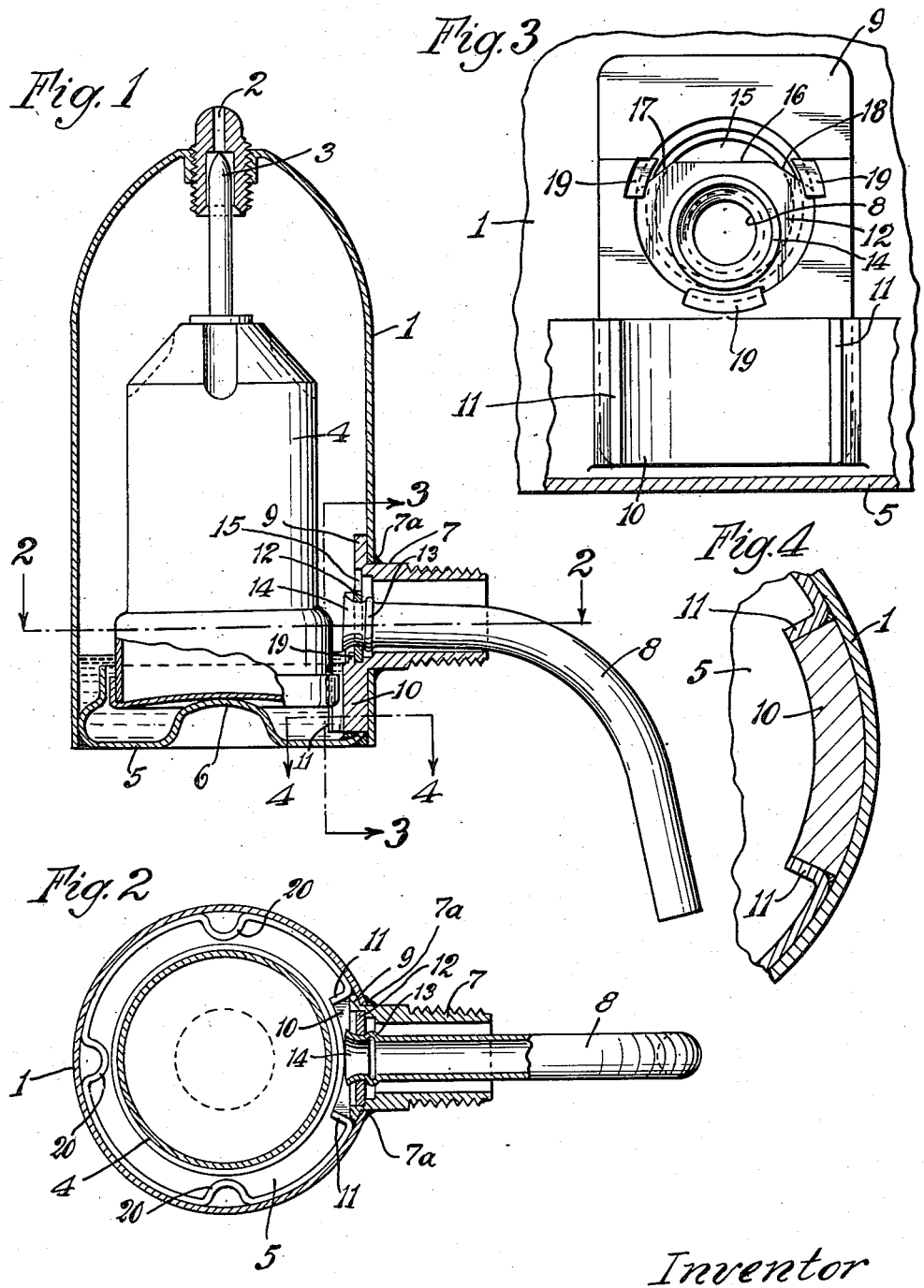
Inventor
George R. Metzdorf
by Parker & Carter
Attorneys.

Patented May 26, 1942

2,284,007

UNITED STATES PATENT OFFICE 2,284,007

AIR VALVE

George R. Metzdorf, Chicago, Ill., assignor to The Dole Valve Company, Chicago, Ill., a corporation of Illinois Application August 2, 1940, Serial No. 349,604

5 Claims. (Cl. 137—122)

This invention relates to air valves and has for its object to provide a new and improved device of this description.

The invention has as a further object to provide an air valve having a casing with a nipple connected therewith and a simple and effective means of connecting this nipple in position. The invention has as a further object to provide an air valve with a nipple and a syphon tube provided with a baffle connected with the nipple and syphon tube, which permits water to drain out at the bottom and the steam to pass in at the top. The invention has as a further object to provide an air valve having a casing with a bottom having an inturned edge and separate from the casing, and a nipple which has an enlargement engaging the casing and the inturned edge of said bottom.

The invention has other objects which are more particularly pointed out in the accompanying description.

Referring now the drawing,

Fig. 1 is a sectional view through one form of device embodying the invention;

Fig. 2 is a sectional view taken on line 2—2 of Fig. 1;

Fig. 3 is an enlarged sectional view taken on line 3—3 of Fig. 1;

Fig. 4 is an enlarged sectional view taken on line 4—4 of Fig. 1.

Like numerals refer to like parts throughout the several figures.

In the construction shown there is provided a casing 1 with an air vent 2 and a valve member 3 which controls said air vent, said valve member being connected with the float 4. The casing 1 is provided with a bottom 5 which is separate therefrom, but which is attached thereto. The float 4 rests upon the upwardly bent portion 6 of the bottom 5. There is a nipple 7 which projects through an opening in the casing near the bottom thereof, and by means of which the air valve is fastened to the radiator. A drain pipe 8 extends through this nipple. The nipple is provided with an enlarged end which may be integral therewith or attached thereto and which preferably has an upper thin end 9 and a lower thicker end 10. This enlarged end is on the inside of the casing. The bottom 5 is open at one side and has inwardly bent inclined portions 11. The portion 10 of the enlarged end of the nipple fits into the space between the parts 11 of the bottom and engages said parts and is preferably connected thereto by solder or otherwise. This enlarged end of the nipple is also preferably soldered to the casing and the nipple is preferably soldered to the casing as shown at 7a, to prevent leakage.

There is a washer 12 surrounding the drain pipe 8 and located between the shoulders 13 and 14 thereon. This washer is preferably shaped so that it does not entirely fill the opening in the nipple, but leaves a space 15, at the top, through which steam may enter the valve casing. In order to provide this opening, the washer preferably has a flat top 16 and is also preferably cut away at the edges 17 and 18, as shown. The washer is held in position by the holding pieces 19 which are preferably integral with the nipple 7 and are provided by punching or deforming the nipple so as to project past the washer so as to hold it in position, see Fig. 3.

The bottom is preferably provided with a plurality of inwardly extending projections 20 which center the float 4.

The air valve when in use, is attached to the radiator by the nipple 7, with the drain pipe 8 inside of the radiator. The steam and water enter the casing 1 through the nipple and the opening 15, which drives the air out of the air vent opening 2. The portion of the steam which is condensed, settles to the bottom of the casing and the lower portion of the washer 12 prevents it from flowing out through the drain pipe until a predetermined level of water is secured in the casing, whereupon the water will then drain out through the drain pipe 8 into the radiator. The steam as it passes through the nipple, hits the washer 12 and said washer assists in directing the steam upwardly, as it enters the casing 1. The thin upper part 9 of the enlargement of the nipple makes it easier for the steam to go upwardly as it affords very little obstruction to this upward movement of the steam. The part 10 of the enlargement on the nipple fills the opening in the bottom 5 so that water is maintained in this bottom to partially submerge the float 4.

The narrow upper part 9 of the enlarged end of the nipple provides more space between the float and the casing and aids in the drainage of the water out of the casing. When the water rises above a predetermined height, the float 4 is lifted so as to close the opening 2 to prevent water from escaping.

I claim:

1. An air valve comprising a casing made of a single piece having an opening in the side thereof, a nipple extending through said opening in the casing for attaching it to a radiator, said nipple provided with an enlargement on the inside of the casing, and a bottom separate from the casing and located entirely within the casing and having an inwardly projecting part having an opening at one side, the enlargement on said nipple fitting into this opening and being attached to the bottom.

2. An air valve comprising a casing, a nipple extending through said casing for attaching it to a radiator, said nipple provided with an enlargement on the inside of the casing, a cup-shaped bottom separate from the casing and having an opening at one side, the enlargement on said nipple fitting into this opening and being attached to the bottom, a drain pipe extending through said nipple and projecting from the outer end thereof, a washer having an opening therethrough and fitting over the inner end of said drain pipe, said washer closing the opening through the nipple below the drain pipe and extending part way across the opening through the nipple above the drain pipe, so as to leave an opening above the washer for communication between the exterior and the interior of the valve casing.

3. An air valve comprising a casing, a nipple extending through said casing for attaching it to a radiator, said nipple provided with an enlargement on the inside of the casing, having an upper thin portion and a lower thicker portion, a cup-shaped bottom separate from the casing and having an opening at one side, the thicker portion of the enlargement on the nipple fitting into this opening and being attached to the bottom, a drain pipe extending through said nipple and projecting from the outer end thereof, and a washer having an opening therethrough and fitting over the inner end of said drain pipe, said washer closing the opening through the nipple below the drain pipe and extending part way across the opening thorugh the nipple above the drain pipe, so as to leave an opening above the washer and in proximity to the thin portion of the enlargement on the nipple, for communication between the exterior and the interior of the valve casing.

4. An air valve comprising a casing having an opening near the bottom, a nipple connected with the casing at the opening and projecting outwardly therefrom, a drain pipe extending into said nipple and projecting outwardly therefrom, and a washer surrounding the inner end of said drain pipe and larger in diameter than the opening through said nipple, said washer engaging the nipple so as to close the lower part of the opening between the nipple and the drain pipe, the upper part of the washer being separated from the wall of the nipple by a space through which steam may enter the valve casing, the washer being so constructed and arranged as to direct the steam in an upwardly direction through this opening.

5. An air valve comprising a casing having an opening near the bottom, a nipple connected with the casing and projecting outwardly therefrom, a drain pipe extending into said nipple and projecting outwardly therefrom, and a washer surrounding the inner end of said drain pipe and larger in diameter than the opening through said nipple, said washer closing that portion of the opening in the nipple from the top of the drain pipe to the bottom of the nipple opening, but leaving a space above said drain pipe through which steam may enter the valve casing, said washer being so constructed and arranged as to direct the steam in an upwardly direction through said opening into said casing.

GEORGE R. METZDORF.